United States Patent [19]

Kawakita et al.

[11] 4,106,038
[45] Aug. 8, 1978

[54] INDICATOR IN A FINDER

[75] Inventors: Yukimasa Kawakita; Youichi Okuno, both of Yokohama, Japan

[73] Assignee: Canon Kabushiki Kaisha, Tokyo, Japan

[21] Appl. No.: 688,964

[22] Filed: May 24, 1976

Related U.S. Application Data

[63] Continuation of Ser. No. 482,896, Jun. 25, 1974, abandoned, which is a continuation of Ser. No. 393,185, Aug. 30, 1973, abandoned.

[30] Foreign Application Priority Data

Sep. 4, 1972 [JP] Japan .................................. 47/88545

[51] Int. Cl.² ............................................ G03B 19/12
[52] U.S. Cl. .................................................. 354/155
[58] Field of Search ...................... 95/11 V, 42, 44 R; 354/39, 60 EI, 154, 155, 219, 224, 225, 289, 22, 53-57, 199-201, 152; 352/171; 350/111, 114-116, 127

[56] References Cited

U.S. PATENT DOCUMENTS

| | | | |
|---|---|---|---|
| 2,915,935 | 12/1959 | Pabst et al. | 350/127 X |
| 3,498,198 | 3/1970 | Fujii | 354/155 UX |
| 3,590,703 | 7/1971 | Ono | 354/155 X |
| 3,630,134 | 12/1971 | Nakamura | 354/155 |
| 3,728,951 | 4/1973 | Kondo | 95/11 V X |
| 3,754,813 | 8/1973 | Depalma et al. | 350/127 |
| 3,760,700 | 9/1973 | Trankner et al. | 354/155 X |

FOREIGN PATENT DOCUMENTS

| | | | |
|---|---|---|---|
| 235,690 | 9/1964 | Austria | 354/219 |
| 50,419 | 9/1966 | German Democratic Rep. | 354/155 |
| 1,274,438 | 8/1968 | Fed. Rep. of Germany | 354/152 |

*Primary Examiner*—Donald A. Griffin
*Attorney, Agent, or Firm*—Toren, McGeady and Stanger

[57] ABSTRACT

In the disclosed single lens reflex camera a focusing screen presents exposure information in addition to an image of the scene to be photographed. The image area of the screen is surrounded by walls protruding upward from and integral with the screen to prevent dust from entering the image area and to space the viewfinder lens from the screen in a dust tight manner along all or most of the periphery. Also disclosed is a pointer in a second area adjacent to one wall outside the image area which indicates information on a scale or a sliding plate.

A Fresnel lens, angled edge, or other means formed on the upper and/or lower side of the screen directs light to both the image area and the second area.

11 Claims, 11 Drawing Figures

F I G. 3A
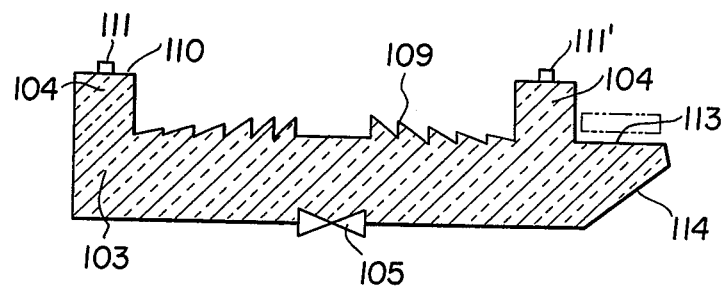
F I G. 3B
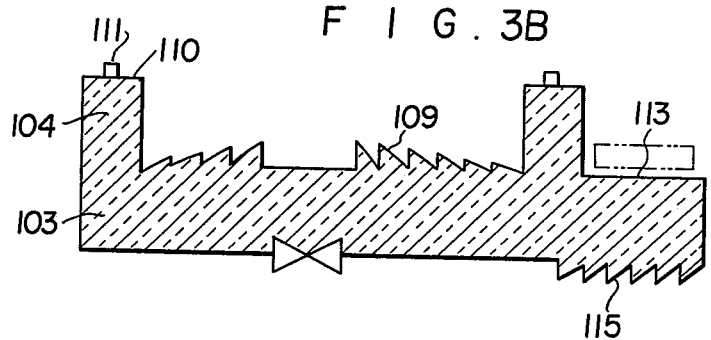
F I G. 3C
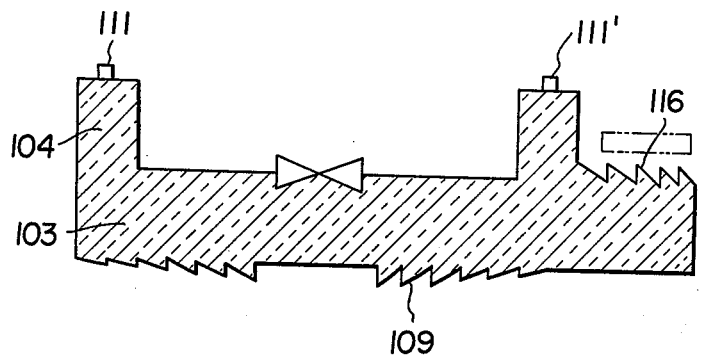

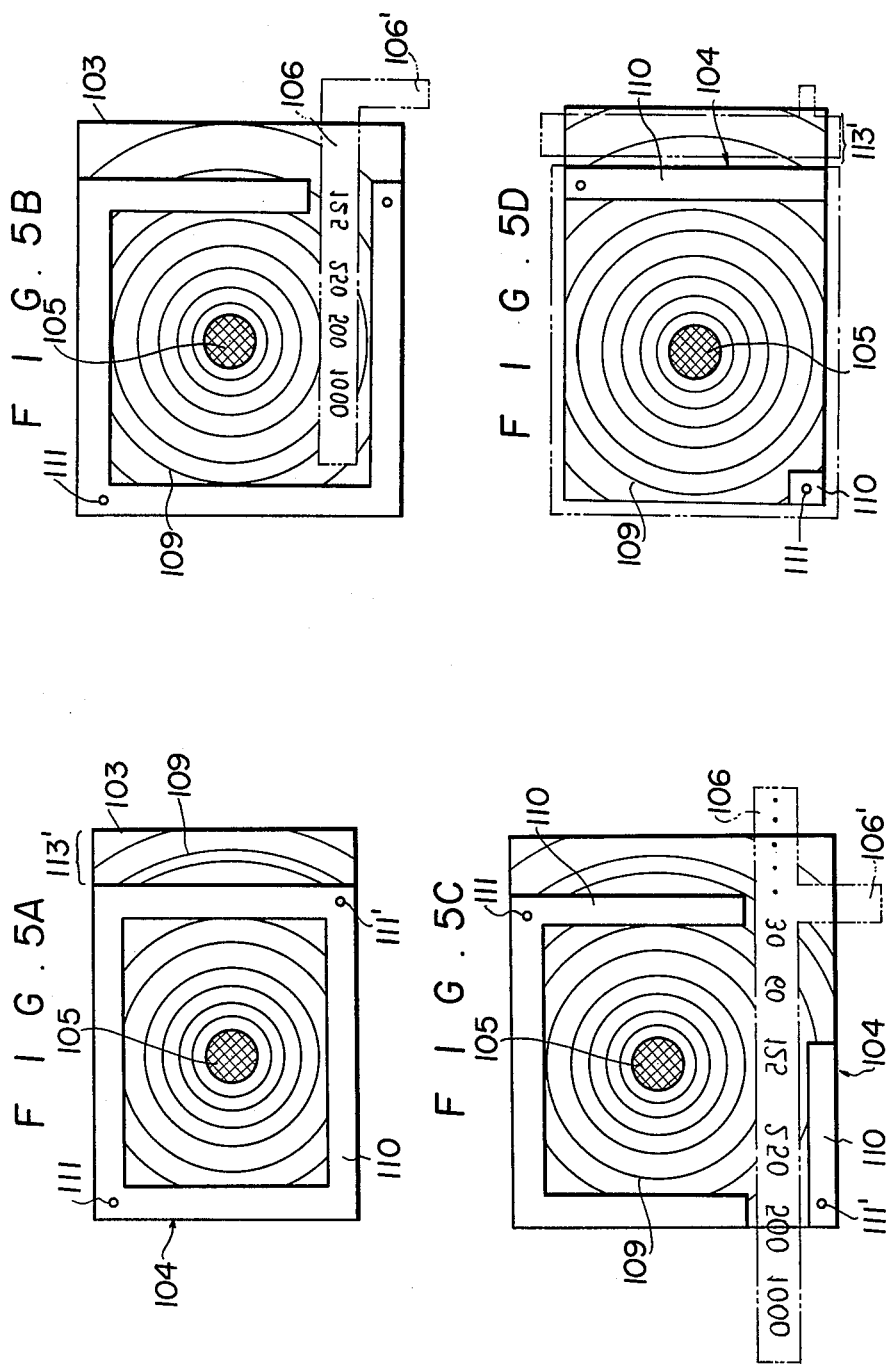

INDICATOR IN A FINDER

This is a continuation of application Ser. No. 482,896, filed June 25, 1974, which in turn was a continuation of application Ser. No. 393,185 filed Aug. 30, 1973 both now abandoned.

BACKGROUND OF THE INVENTION

This invention relates to cameras, particularly those having viewfinders presenting object images together with exposure information.

To exhibit exposure information, such as shutter speed, stop value, focusing distance, or other information in the viewfinder of a single lens camera, plates carrying such exposure information have been inserted between a focusing plate and a condenser lens. The plate is illuminated by a portion of the light flux which passes through an objective lens and is reflected by a mirror. The illumination makes the impressions upon the plate visible in the viewfinder.

In prior art systems of this type dust often intrudes into the image area.

Where the image area on the screen supports optical projections, such as the type that form Fresnel lenses, preventing dust accumulation is not only troublesome, but may be destructive to the projections themselves.

SUMMARY OF THE INVENTION

It is an object of the invention to provide an indicator in a finder, in which any dust is prevented from entering onto the image area of the focussing plate. For that object, a wall is provided to surround the image area, and a mask covers upper face of this wall. A condenser lens covers the mask, thereby preventing the intrusion of dust from outside. The image area includes optical projections, that may, for example, form a Fresnel lens. The wall extends beyond the projections in the direction of the projections. Preferably it is integral with the plate.

Another object of the invention is to provide an indicator in a finder, in which the information may be observed with almost same distinction as an image. Namely, contrary to the usual device, in which the indicated informations are dark, the quantity of light form illuminating the information plate is increased by forming a Fresnel groove or grating or the like.

BRIEF DESCRIPTION OF DRAWINGS

FIG. 3A, FIG. 3B and FIG. 3C are respective sectional views of other embodiments of focussing members used for an indicator of the present invention.

FIG. 5A, FIG. 5B, FIG. 5C and FIG. 5D are respective plan views of other embodiments of the focussing members used for the indicator of the present invention.

DETAILED DESCRIPTION OF EMBODIMENTS

Figure 1:
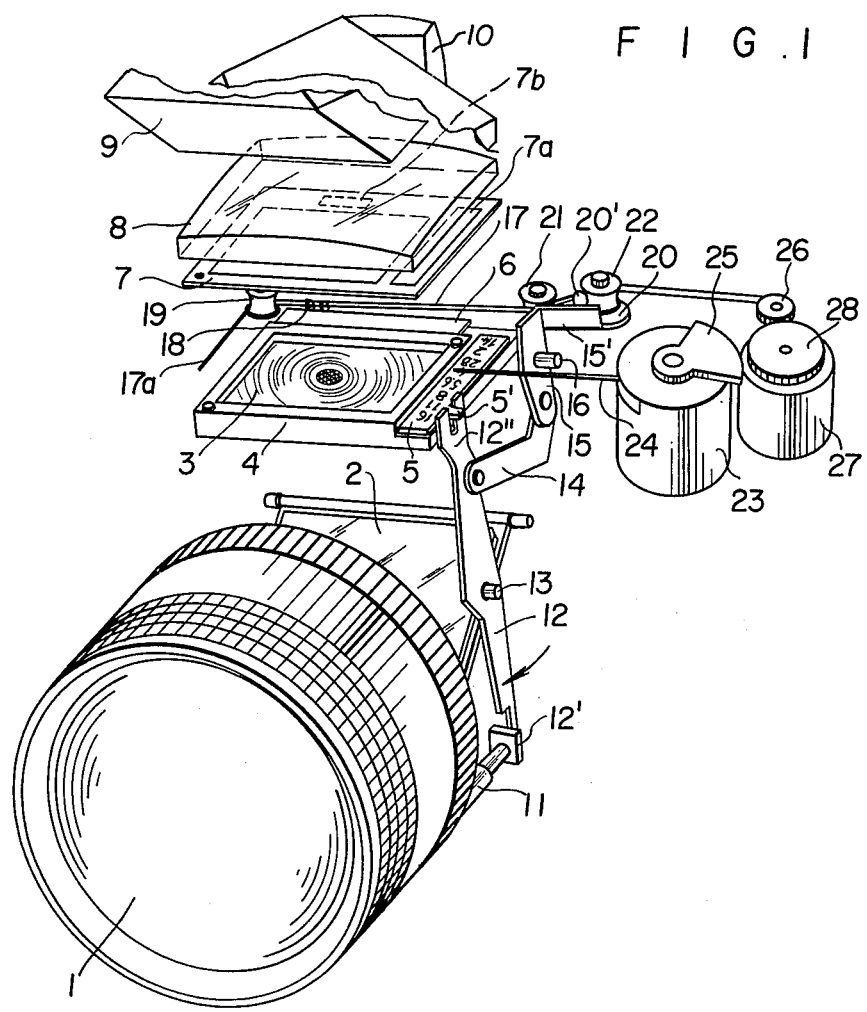
FIG. 1 is a perspective view showing an embodiment of the present invention.
Figure 2:
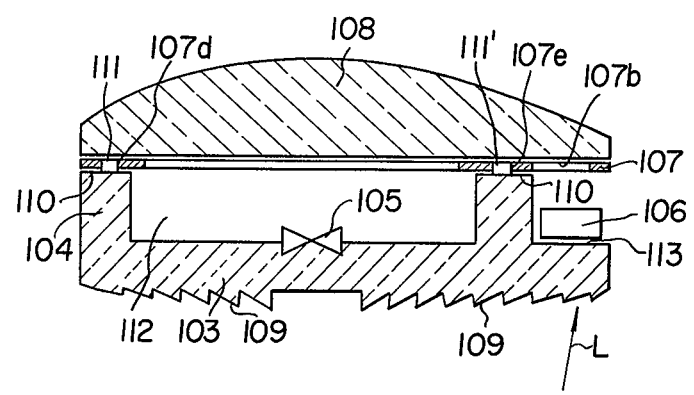
FIG. 2 is a sectional view comprising a focussing member, a mask and a condenser lens shown in FIG. 1.

In FIG. 1, 1 denotes an objective, 2 a mirror, 3 a focussing member. Numeral 4 denotes a Protruding portion formed on the surface of the focussing member. Character 5 denotes a first information plate, upon which information such as stop values is written. Plate 5 is slidable on a place other than a portion of focussed image of an object light of the focussing member 3. Member 6 is also an information plate upon which information such as shutter speed is written. Element 7 is a mask, which is provided for limiting the observation field and in fact, this mask closely touches the upper surface of the protruding portion 4 of the focussing member 3, and a condenser lens 8 is placed in close contact with the mask. Number 9 denotes a pentagonal prism and 10 an eye-piece. A pin 11 defines the F-number, and length of this pin is determined by open F-number of each interchangeable lens. Numeral 12 denotes a lever which is fitted rotatably around an axis 13 fixed to a camera body (not shown), and energized by spring or the like in the direction of an arrow. The lever 12 forms an engaging portion 12' with a pin 11 on its one end, and a fork 12" engaging with a projection 5' of the information plate 5 on its another end.

A connecting lever 14 has, one end rotatably set by a pin on the lever 12 and another end rotatably set by a pin on a member 15 for compensating a meter. The member 15 is rotatable around a pin 16 which is fixed to a camera body (not shown) and a projection 15' is provided on a portion of the member. A string 17 has, one end 17a connected with a shutter timing control means (not shown). A fitting tool 18 connects a second information plate 6 and the string 17. Numberal 20 denotes a member for fitting guide pulleys 21 and 22 and a projection 20" is formed at a position engageable with the projection 15'. This member 20 is rotatable around a shaft of pulley 21, which shaft is fixed to the camera body (not shown), and is generally locked by a spring at a constant position.

And, 23 denotes a meter operated by a photometric circuit (not shown), 24 a pointer and 25 a segment gear for compensating the meter. The meter 23 is fitted to the camera body (not shown). Reference character 26 denotes a pulley, 27 a means for compensating the meter according to the shutter timing and 28 a gear operated by this means engaging with a gear 25.

When the objective 1 is attached to the camera body with this arrangement, information about the open F-number of this lens is provided by the pin 11. The pin 11 pushes the engaging portion 12' and the lever 12 is rotated around the axis 13. This rotation makes the first information plate slide through the fork 12" and the projection 5'.

The first information is now written over a very wide range of values. However some interchangeable objectives may have large F-numbers. Thus the information plate is slidably moved so as to make only the values in useful range visible.

The numerial values on the first information plate 5 are observed from the eyepiece 10 through an opening 7a of the mask 7.

On the other hand, the string 17 moves in response to the control of the shutter timing. Thus the second information plate 6 also moves and the shutter timing is observed at the eyepiece 10 through the opening 7b of the mask.

Rotation of lever 12 moves the connecting lever 14, and rotates the member 15. At this time, if the F-number of interchangeable lens is small and some compensations are required for the indication of meter, the projections 15' and 20' may be formed to engage each other. The pulley 22 is then moved to change the tension of the string 17, thus adjusting the meter.

The compensating means 27 rotates the meter 23 according to the change of tension of the string 17, thus compensating for positions pointed by the pointer 24.

In the next place, detailed explanation will be made about the focussing member.

In the drawings, 103 denotes a focussing member made of glass, synthetic resin or the like, 104 protruding portions, 105 an optical means for focusing a microprism or the like, 106 an information plate, 107 a mask, 107b an opening for information indication, and 108 a condenser lens. A Flesnel lens 109, may be integrally formed when the focussing member is made. Numeral 110 denotes an upper surface of the protrusion 104, 111 or 111″ denotes pins provided on the upper surface 110, which pins engage holes 107d or 107e bored in the mask to regulate the position of mask, as well as to regulate the position of condenser lens which touches the head of pin. And, at this time, the upper surface 110 of protruding portion, the mask 107 and the condenser lens are closely in contact with each other, so that no dust will intrude into a space 112 which is formed by the focussing member 103 and the condenser lens 108.

A flat plane 113 formed on one end of the focussing member 103 is provided in the vicinity of the protrudent portion 104.

As explained above, the information plate slides on the plane 113. However, any dust accompanying the sliding will not enter the space 112.

A portion of the light flux L passing through the objective lens, and illuminating the information plate is given a convergent tendency at the Fresnel lens 109, and after penetrating through the information plate 106, the light is led to the eyepiece without any loss, so that the observation of character information may be effected brightly and clearly.

In the following drawings, same parts are given same reference numbers.

In FIG. 3A, 114 is a slant face which is formed under the flat plane. Hereupon, instead of the Fresnel lens, a structure such as a prism is adopted. In FIG. 3B, numeral 115 denotes a saw-tooth profiled prism or a grating. In FIG. 3C, 116 numberal denotes a saw-tooth profiled prism which is provided instead of a flat plane. These optical means produce the same effect as a Fresnel lens. Further, the position of Fresnel lens 109 or microprism 105 may be suitably selected.

Figure 4A:
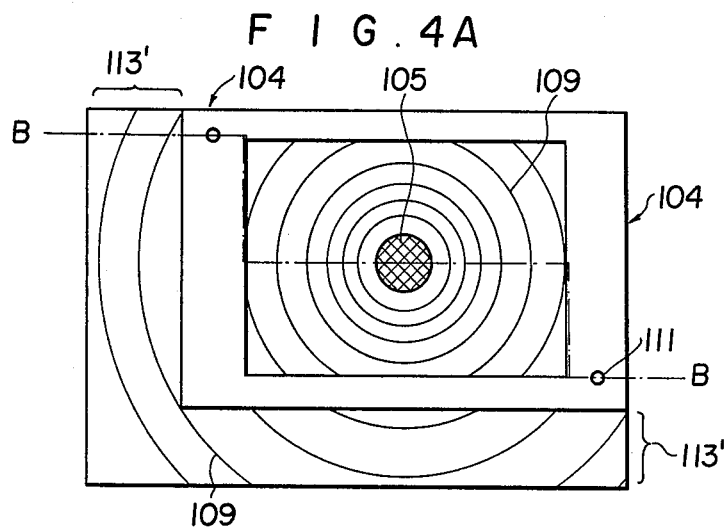
FIG. 4A is a plan view of other embodiment of the focussing member used for the indicator of the present invention.
Figure 4B:
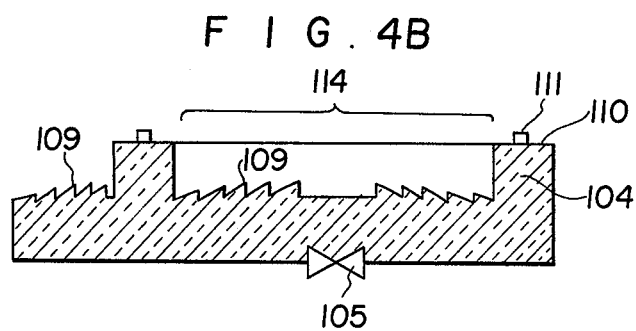
FIG. 4B is a sectional view along B — B line of FIG. 4A.

FIG. 4A and FIG. 4B show an embodiment, wherein all of a portion 114, through which a light flux for focussing image of an object passes, is surrounded by a protruding portion 104. Such a structure is effective for preventing the intrusion of dust from outside. Reference character 113′ denotes a portion on which the information plate slides.

FIG. 5A is an example, in which a continuous protruding portion is formed on the focussing plate, having a sliding portion 113′ merely on one side.

FIG. 5B shows a focussing member, having a protruding portion cut off at one place. Although it may be feared that some dust may intrude from this cut-off place, it has the advantage that the information may be indicated in close contact with the photographing sight.

The embodiment shown in FIG. 5C has a similar purpose, and a protruding portion is formed to prevent the intrusion of dust as much as possible.

FIG. 5D illustrates an embodiment, in which a protruding portion is provided merely on a place along the sliding portion 113′. However it has the advantage that a camera body, to which a focussing member is to be attached, may be made in a small size. Numberal 110 indicates a packing, which is attached on the side of camera body for preventing the intrusion of dust from outside.

What is claimed is:

1. A single lens reflex camera having an objective lens,
    an eyepiece,
    a focusing screen on which an image formed by the light transmitted by the objective lens is focused, said screen having first and second faces, said focusing screen having a first zone in which the image is formed and a second zone adjacent thereto, said screen having a plurality of projections on one of the faces in the first zone, a portion protruding beyond the projection from one of the faces of the focusing screen and completely surrounding the first zone and separating the first zone from the second zone;
    a movable exposure information indication member positioned in the second zone of the focusing screen, and
    a light guide means including a pentaroof prism for guiding the light from the first and second zones of the focusing screen to the eyepiece,
    characterized in that said protruding portion is integral with said one of the faces of the focussing screen and that said protruding portion and said screen is composed of a single unitary continuous homogeneous material, and light transmitting means including a transparent member cover said portion and form a dust tight space over the first zone.

2. A single lens reflex camera according to claim 1, in which the transparent member is a condenser lens.

3. A single lens reflex camera as in claim 1, wherein said focusing screen further includes optical means for introducing a portion of the light from the objective lens to said second zone.

4. A single lens reflex camera according to claim 3, in which said optical means is a Fresnel lens.

5. A single lens reflex camera according to claim 3, in which said optical means is a saw-tooth profiled prism.

6. A single lens reflex camera according to claim 3, in which said optical means has a surface in the second zone which slants relative to one of the faces.

7. A camera as in claim 1, wherein said viewing means include a mask between the transparent member and said portion, said mask and said transparent member as well as said portion forming a dust tight arrangement which maintains the space in a dust tight condition.

8. A single lens reflex camera comprising:
    an objective lens;
    an eyepiece;
    a focusing screen on which an image formed by the light transmitting the objective lens is focused, said focusing screen having a first zone in which the image is formed and a second zone adjacent thereto;
    a wall provided on one side of the focusing screen and surrounding the first zone and the second zone, said wall being notched at least partially;
    a transparent member for covering an opening portion formed by the wall;
    a masking frame between said transparent member and said wall;

a movable indicator extending through the notched portion of the wall to the second zone and light guide means including a pentaroof prism for guiding the lights from the first and second zones of the focusing screen to the eyepiece;

the focusing screen being provided with optical means for introducing a portion of the light from the objective lens to the second zone, said screen having a plurality of projections, said wall being integral and unitary with the focusing screen and protruding beyond the projections, said wall and said screen together being made from one substantially homogeneous material.

9. A single lens reflex camera according to claim 8, in which said optical means is a Fresnel lens.

10. A single lens reflex camera according to claim 8, in which said optical means is a saw-tooth profiled prism.

11. A single lens reflex camera according to claim 8, in which said optical means has a surface in the second zone which slants relative to one of the faces.

* * * * *